US005832919A

United States Patent [19]

Kano et al.

[11] Patent Number: 5,832,919

[45] Date of Patent: Nov. 10, 1998

[54] PORTABLE INFLATABLE ENCLOSURE SYSTEM WITH FILTERED POSITIVE PRESSURE GAS FED THEREIN

[76] Inventors: Yoshimi Kano, 1-4-24, Sumitoshi-Yamate, Higashi-nada, Kobe, Japan, 658; Isao Yamada, 220-59, Kondo-cho, Nara, Japan, 630

[21] Appl. No.: 639,031

[22] Filed: Apr. 16, 1996

[51] Int. Cl.[6] .......................... A61G 10/00; A62B 31/00; B64D 10/00; B64G 6/00

[52] U.S. Cl. .......................................... 128/205.26; 600/20

[58] Field of Search .......................... 128/201.23, 201.25, 128/202.12, 202.18, 204.16, 205.26; 600/20, 21

[56] References Cited

U.S. PATENT DOCUMENTS

| | | | |
|---|---|---|---|
| 306,390 | 10/1884 | Fahrney . | |
| 2,389,293 | 11/1945 | Blosser | 128/205.26 |
| 2,603,214 | 7/1952 | Taylor . | |
| 2,694,403 | 11/1954 | Hudson . | |
| 3,000,379 | 9/1961 | Viers | 128/204.16 |
| 3,255,751 | 6/1966 | Douet | 128/205.26 |
| 3,272,199 | 9/1966 | Matthews . | |
| 3,709,210 | 1/1973 | Matthews . | |
| 3,710,791 | 1/1973 | Deaton | 128/205.26 |
| 3,724,172 | 4/1973 | Wood | 128/205.26 |
| 3,786,809 | 1/1974 | Kitrilakis | 128/205.26 |
| 3,799,163 | 3/1974 | Heath | 128/205.26 |
| 3,878,570 | 4/1975 | Donnelly . | |
| 4,407,280 | 10/1983 | Trammell et al. | 128/205.26 |
| 4,444,183 | 4/1984 | Heckendorn | 128/205.26 |
| 4,525,884 | 7/1985 | Tolley . | |
| 4,581,986 | 4/1986 | Conklin et al. . | |
| 4,959,877 | 10/1990 | Covil . | |
| 5,181,883 | 1/1993 | Hofstra et al. . | |
| 5,314,377 | 5/1994 | Pelosi, III . | |

FOREIGN PATENT DOCUMENTS

| | | |
|---|---|---|
| 1327225 | 2/1994 | Canada . |
| WO 91/18247 | 11/1991 | WIPO . |

*Primary Examiner*—Kimberly L. Asher
*Attorney, Agent, or Firm*—Arthur A. Gardner & Associates, P.C.

[57] ABSTRACT

A portable enclosure system and method for providing a suitable breathing atmosphere therein includes a chamber. The chamber may assume a variety of shapes. An electric fan and filter assembly is provided and is attached to the chamber by way of a flexible air hose. The fan draws air into the fan and filter assembly and exhausts it into the air hose through a filter. The filtered air travels into the chamber thus providing a positive pressure within the chamber. The positive pressure within the chamber forces unwanted particulates out of the chamber by way of exhaust ports and prevents unwanted particulates from entering the chamber. In providing an enclosure filled with a suitable breathing environment, the chamber is placed on a substantially flat surface. The fan is turned on and the chamber is allowed to be purged of unwanted allergens. The fan remains on to maintain a positive pressure within the chamber and provide a steady supply of fresh filtered air.

17 Claims, 6 Drawing Sheets

PORTABLE INFLATABLE ENCLOSURE SYSTEM WITH FILTERED POSITIVE PRESSURE GAS FED THEREIN

FIELD OF THE INVENTION

The present invention relates to a portable enclosure system and a method for providing a suitable breathing environment therein, and in particular, is concerned with providing a suitable breathing environment for persons with allergies.

BACKGROUND OF THE INVENTION

There are a variety of human diseases which are caused by airborne allergens such as asthma, allergic rhinitis and atopy dermatitis. For example, asthma is a condition which is characterized by recurring attacks of dyspnea (shortness of breath), a feeling of pressure on the chest, wheezing coughing and anxiety. The distressing symptoms are caused by a constriction of the bronchial tubes which are the tube-like structures which carry air to and from the lungs. The length of an "asthma attack" may vary from several minutes to several hours. The main cause of true asthma is sensitivity to certain substances in the air such as hair, dandruff, cat and dog dander, pollen, dust, mites, insect excrement and other small air-borne particles. These substances are collectively called "allergens". Although sensitivity to asthma may be reduced or cured by a series of injections with small doses of the offending allergen, they can only be prevented by eliminating, as far as possible, the offending allergen from the environment. The most vulnerable time for an asthmatic, especially an asthmatic child, to have an asthma attack is while sleeping. The patient may suffer through the attack for several minutes before awakening. The combined effects of the asthma attack, fatigue and darkness may exacerbate the anxiety an asthmatic feels during an attack. In children, this may cause panic and physical injury as a result. Unfortunately, in any household, one of the greatest concentrations of allergens is found on the surface of a bed. When a persons gets into bed, these allergens become airborne and are breathed by the asthmatic and could result in an asthma attack.

Although the known art offers a number of examples wherein an enclosure system is provided, none are suitable for home use and none combine the required qualities of removing unwanted allergens, portability, safety, ease of assembly, ease of operation, ease and low cost of manufacture and quiet operation so as not to disturb the sleep of the asthmatic. For example, U.S. Pat. No. 3,000,370 entitled "Oxygen Tent Apparatus", issued to John J. Viers on Sep. 19, 1961 discloses an enclosure system designed to administer oxygen. Disadvantages associated with the Viers tent include a frame which is complex in design, cumbersome and not suited to the portability required for home use. Additionally, the Viers system requires a large electric motor and compressor unit to provide the required circulation to and from the enclosure. Finally, the Viers enclosure system is designed specifically to administer oxygen and does nothing to remove unwanted allergens from the breathing air. Another example of the known art is U.S. Pat. No. 2,603,214, entitled "Allover Bed and Canopy to Administer Oxygen" issued to Taylor on Jul. 15, 1952. Again, the Taylor canopy is not suited to home use as it is not portable, requires a cumbersome framing system, various inlets and outlets to accommodate the oxygen supply and cooling units and requires complex mechanical accessories to operate. The Taylor canopy is not designed to remove allergens from an enclosed space.

Therefore, there is a need for a portable enclosure system and method for creating and maintaining a suitable breathing environment for those persons with allergies which avoids the disadvantages described above and is quiet, easy to assemble, convenient to store and inexpensive to manufacture.

SUMMARY OF THE INVENTION

It is an object of the present invention to provide a portable enclosure system and a method which creates a suitable breathing environment for persons with allergies and is safe, quiet, easy to assemble, convenient to store and inexpensive to manufacture.

In accordance with the present invention there is provided a portable enclosure system comprising a soft-walled structure to enclose a volume of air; means for supporting the structure; means for generating a positive air pressure within the structure; means for removing unwanted allergens from the air entering the structure; and, means for exhausting allergen contaminated air from the structure.

It is contemplated that the chamber may assume a variety of shapes capable of enclosing a sufficient volume of air to provide a suitable breathing environment. For example, tent-like shapes, dome shapes and conical shapes may be used.

It is further contemplated that the chamber may be fabricated from a variety of materials which possess the required characteristics of softness, flexibility, resilience, light-weight and capable of enclosing a pressurized atmosphere.

It is additionally contemplated that the chamber may obtain its desired shape by suspending the chamber from suitable external framing means or by supporting the chamber using integral framing members.

In the preferred embodiment of the present invention there is provided a soft-walled plastic enclosure comprising three rectangular side panels and a rectangular top panel which are transparent and joined in such a way as to form a box-like chamber. The bottom of the enclosure is sealed with a plastic membrane. The remaining side of the enclosure is covered with a plastic, transparent curtain, with a width greater than the width of the enclosure and with a length greater than the height of the enclosure to allow entrance and egress from the enclosure while being sufficiently sealed to maintain a positive pressure within the enclosure.

For the purpose of connecting each of the panel frames together in the preferred embodiment of the invention and in order to form a self-supporting box-like chamber each of the panel frames possesses a lap of material or skirt around its outer circumference. It is evident that the panel frames can be joined together using these laps of material by overlapping them and sealing them together to form an air-tight seal which results in the provision of support for the overall structure.

In the preferred embodiment of the present invention there is provided a portable enclosure system comprising a box-like soft-walled chamber made from four rectangular transparent panels which are framed by inflatable collars joined to form the chamber. The bottom of the chamber is sealed by a plastic membrane. The front of the chamber is closed by a flexible, plastic and transparent curtain. In the practice of the invention, the chamber is placed on a surface and is of sufficient length and width to provide the desired volume of enclosed space. On a sleeping surface, such as a bed, the chamber may enclose the upper torso and head of the sleeper or it may be dimensioned so that it encloses the entire bed.

It is contemplated that the enclosure may enclose the upper torso and head of a sleeping person who will move about during sleep. Therefore, provision is made for such movement by the curtain being free at its bottom end and joined at its sides to the adjacent side framing collar. Furthermore, it is jointed at its top to the adjacent top framing collar. The curtain can be a single piece or it can be a two piece curtain with one piece overlapping the other to facilitate entering and exiting the chamber while still maintain a positive air pressure in the chamber.

Incidentally, it will be appreciated that movement of the sleeper could raise the curtain off of the sleeping surface and thus cause the corruption of the environment within the enclosure by allowing allergens to enter. To solve this particular difficulty, the invention contemplates a curtain of sufficient length that it lies substantially horizontally on the surface upon which the chamber is placed. It is contemplated that the curtain is of sufficient weight to lay flat on the surface to assist in maintaining a positive pressure environment within the chamber while allowing the comfortable movement of the sleeper.

In the practice of the invention the fan and filter assembly is electrically operated and capable of generating a sufficient air flow to provide a positive pressure within the chamber. It will be appreciated that the fan must be adequately reliable and quiet to provide a steady flow of air without disturbing the sleeper. The fan may operate on ac current or it may operate on dc current to suit the circumstance of operation.

Pursuant to the present invention there is provided a filter of adequate efficiency to remove the unwanted allergens from the air entering the chamber. The filter is modular and removable from a fan and filter assembly. A suitable filter may be chosen and installed such that the desired size of allergen is removed from the air exhausted by the fan.

It is contemplated that the invention include a sufficient length of flexible hose which is sufficiently resilient to resist crushing yet sufficiently light-weight so as not to disturb the stability of the chamber. To resolve the difficulty of counterbalance, the chamber may be suitably counterweighted to offset the effect of the weight of the hose on the stability of the chamber. The chamber and the fan/filter assembly are provided with suitable connectors to provide an air-tight seal between the open end of the hose and the chamber.

In accordance with the present invention there is provided a method for providing a suitable breathing environment within an enclosed space which comprises the steps of: enclosing a first volume of air; filtering and supplying a positive pressure to the first volume of air at a first location; and, exhausting air from the first volume of air at a second location.

Advantages of the present invention are that it provides for a portable enclosure system which is lightweight, easy to assemble, easy to store while not in use, inexpensive to manufacture and purchase, quiet in operation, safe to use, and provides for a method which produces a suitable breathing environment for persons with allergies.

BRIEF DESCRIPTION OF THE DRAWINGS

The present invention will be further understood from the following description with references to the drawings in which.

DETAILED DESCRIPTION

Figure 1:
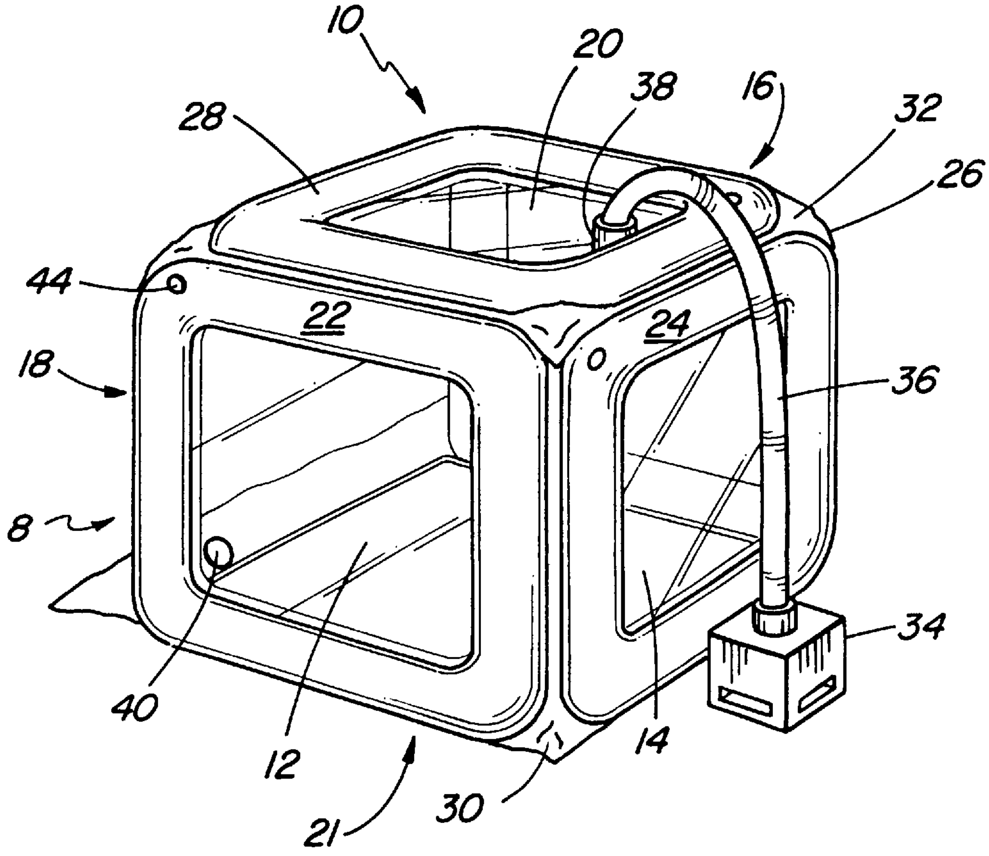
FIG. 1 illustrates a perspective view of one embodiment of the present invention.

Referring to FIG. 1, there is illustrated an portable enclosure system (8) in accordance with a preferred embodiment of the present invention including a box-like, soft-walled chamber (10) which comprises three transparent side panels (12, 14, 16), one transparent top panel (20), one transparent curtain (18) and a bottom sealing membrane (21). Framing side panels (12, 14 and 16) and top panel (20) are inflatable rectangular collars (22, 24, 26 and 28). Each of the inflatable collars has a skirt (30). When the individual inflatable collars are brought adjacent to each other to form the chamber, the skirts (30) overlap and are sealed together to form an air-tight boundary (32) between adjacent inflatable collars. The chamber (10) is equipped with a fan and filter assembly (34) of sufficient capacity to provide an adequate air flow to purge unwanted allergens from the chamber and maintain a positive pressure within the chamber to prevent allergens from re-entering the chamber. The filter is positioned so that it sits above the fan and fan motor filtering air exhausted by the fan into the air hose (36). The filter is a removable and replaceable modular type filter of varying efficiency as desired. An adequate length of hose (36) sufficiently dimensioned to provide the required amount of air flow to the chamber is also provided. Although in the illustrated embodiment of the present invention hose (36) is shown in communication with the enclosed volume formed by the chamber by way of aperture (38) in the top transparent panel (20), it will be understood by a person skilled in the art that hose (36) may communicate with the enclosed volume of air through any one of panels (12, 14 or 16) in such a manner as to provide a flow of filtered air from the top portion of the chamber to the bottom of the chamber. Filtered air is blown into the chamber (10) by the fan (34) by way of air hose (36). Air containing allergens is exhausted from the chamber by way of a plurality of exhaust ports, one (40) of which is shown in FIG. 1. In the event the fan fails or the filter becomes clogged, the exhaust port allows an adequate amount of air back into the chamber to allow normal and comfortable breathing on the part of the person therein.

Figure 2:
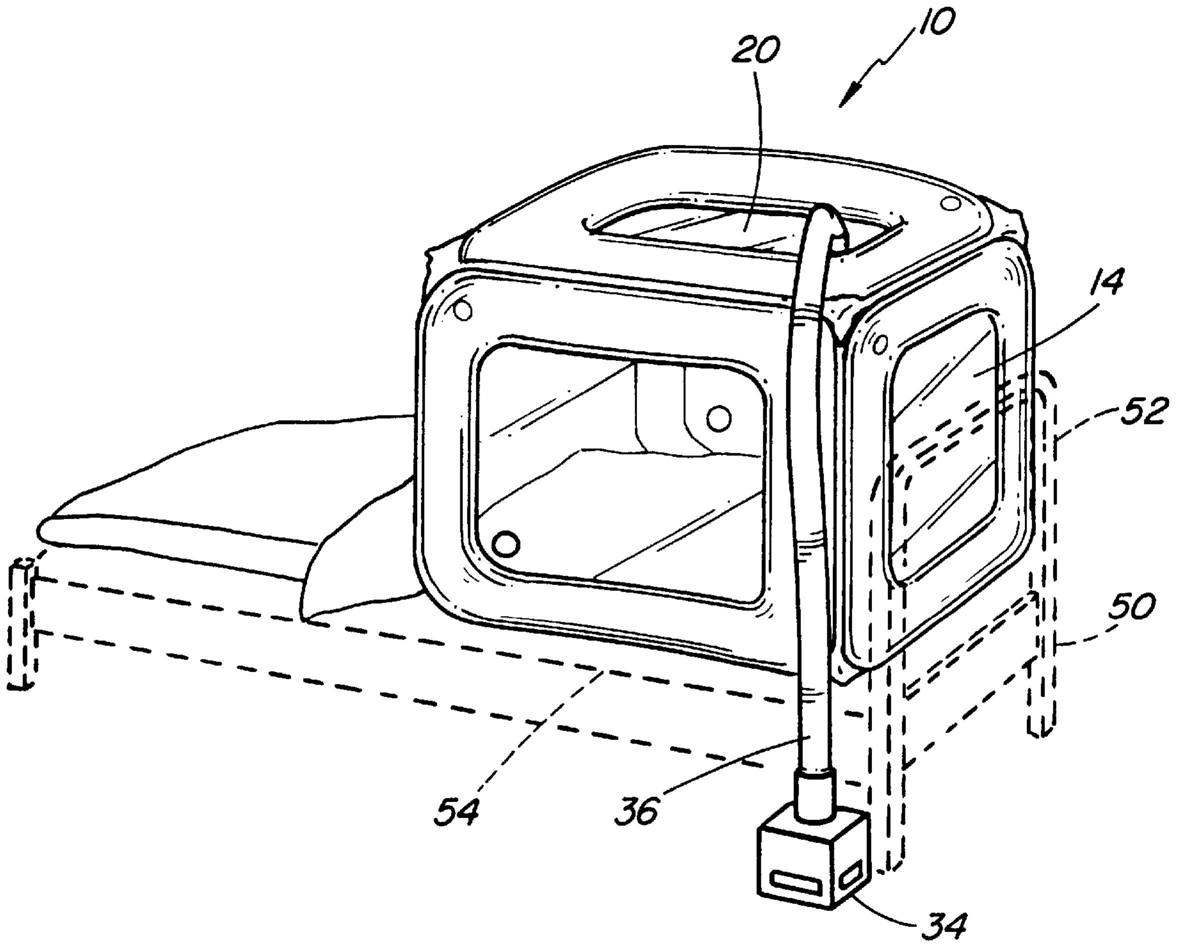
FIG. 2 illustrates another embodiment of the present invention as it would appear on a sleeping surface.

FIG. 2, shows a preferred embodiment of the portable enclosure system with the chamber (10) mounted on a single bed (50). Panel (14) rests against the head board (52) of the bed (50). In the shown embodiment of the invention, the chamber (10) is dimensioned so that it encloses the upper torso and head of the sleeper. The width of the chamber (10) is adequately dimensioned so that it substantially covers the width of the mattress (54) of bed (50). Connecting hose (36) connects the air and filter assembly (34) with the chamber by aperture (38 shown in FIG. 1) in top panel (20). Fan and filter assembly (34) is shown oriented to one side of the bed (50) and can be placed in any position on the floor so that the operator finds it convenient.

Figure 3:
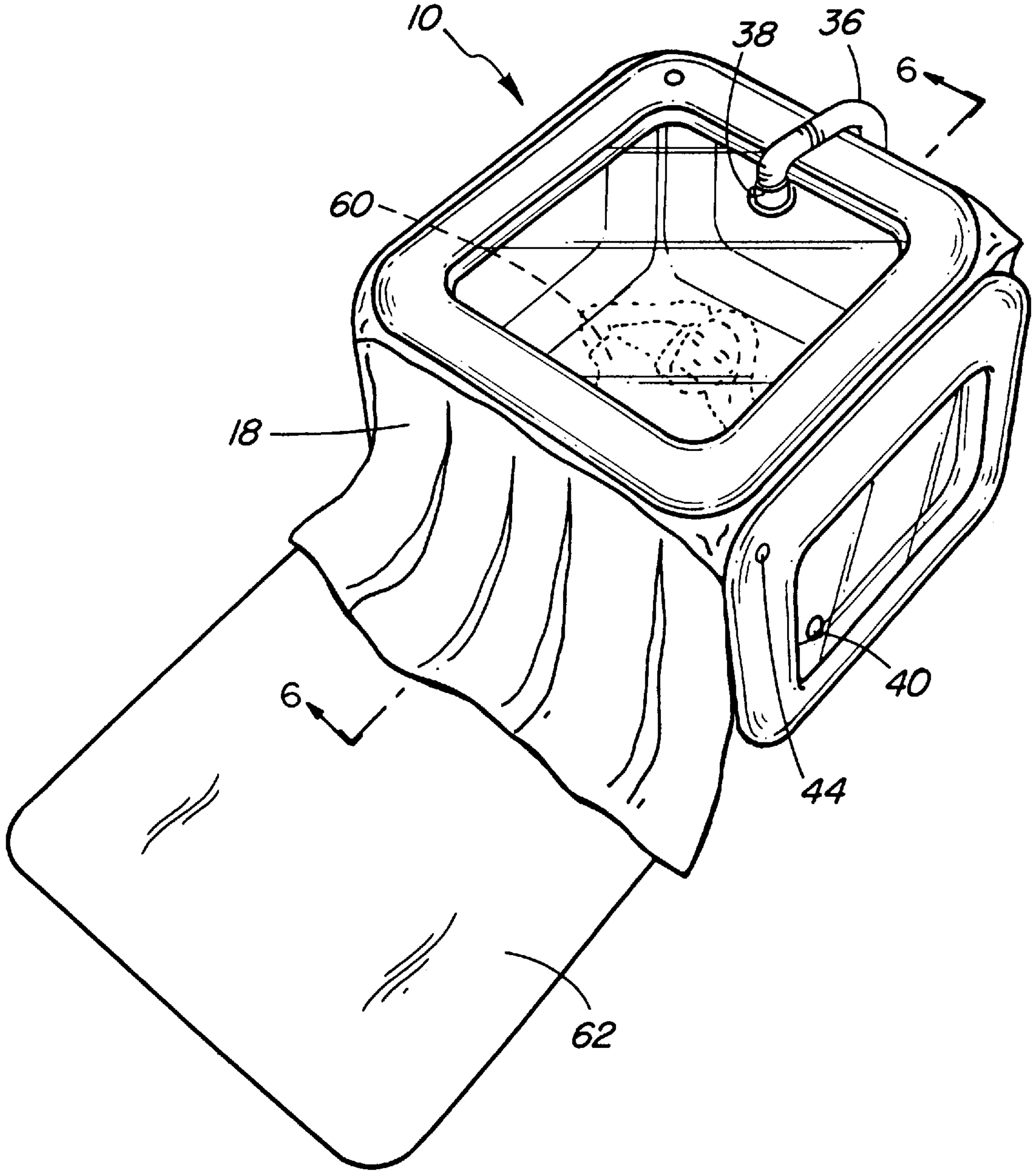
FIG. 3 illustrates a top view of one embodiment of the present invention as it would appear enclosing the upper torso of a person.

Referring to FIG. 3, one embodiment of the present invention is shown in perspective view wherein the chamber (10) is placed on a surface (62). Chamber (10) is dimensioned to adequately enclose the upper torso and head of the sleeper (60). Curtain (18) is shown closing one side of the chamber and extending horizontally towards the foot of the sleeping surface. Curtain (18) is sufficiently dimensioned to accommodate the movement of the person within the chamber without significantly degrading the positive pressure atmosphere within the chamber. As the person shifts position during sleep, curtain (18) adjusts its shape and position to accommodate the movements of the person inside the chamber (10) without displacing the entire chamber off of the surface upon which it rests. To further increase the stability of the chamber and resist external loads imposed by the attached air hose, the chamber may be counter-weighted with suitable weights.

Exhaust port (40) is also shown as is inflation valve (44). Connecting hose (36) fixed to aperture (38) is also shown.

Figure 4:
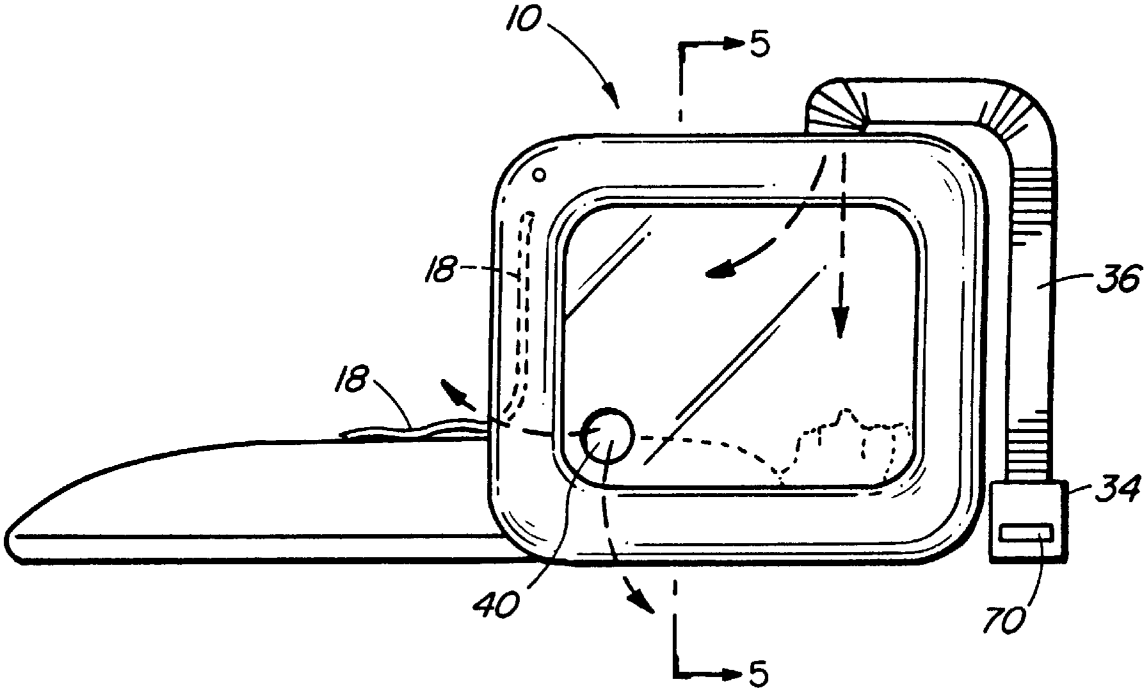
FIG. 4 illustrates the flow of air through one embodiment of the present invention.

Referring to FIG. 4, in operation, the chamber is placed upon a substantially flat surface such as a sleeping surface. The person enters the enclosure by way of curtain (18) and curtain (18) then closes the front side of the chamber and lays substantially horizontal on the bed to maintain a positive air pressure within the chamber. Air is drawn into the fan and filter assembly (34) through a plurality of intake vents (70) and is filtered to remove particulate matter. Typically, a filter capable of removing particulates of 5 microns or larger is chosen but a filter of lesser or greater efficiency may be chosen. The filtered air travels the length of the hose (36) and enters the chamber (10) through the aperture (38 not shown) in the top panel (20 not shown). The fan produces a positive air pressure within the chamber. The air pressure in the chamber is such that a sleeper does not notice any pressure. As the air pressure builds within the chamber, allergens which were present in the atmosphere of the chamber are forced to the bottom of the chamber and blown from the chamber via the plurality of exhaust ports (40). A small amount of filtered air will also leak from under the curtain. However, the leak rate is not sufficient to degrade the positive air pressure within the chamber.

The electric fan (not shown but mounted in the same enclosure as the filter (34)) may also be adjustable to control and vary the amount of air blown into the chamber and thus the air pressure in the chamber. The electric motor may be powered by alternating or direct currents.

Figure 5:
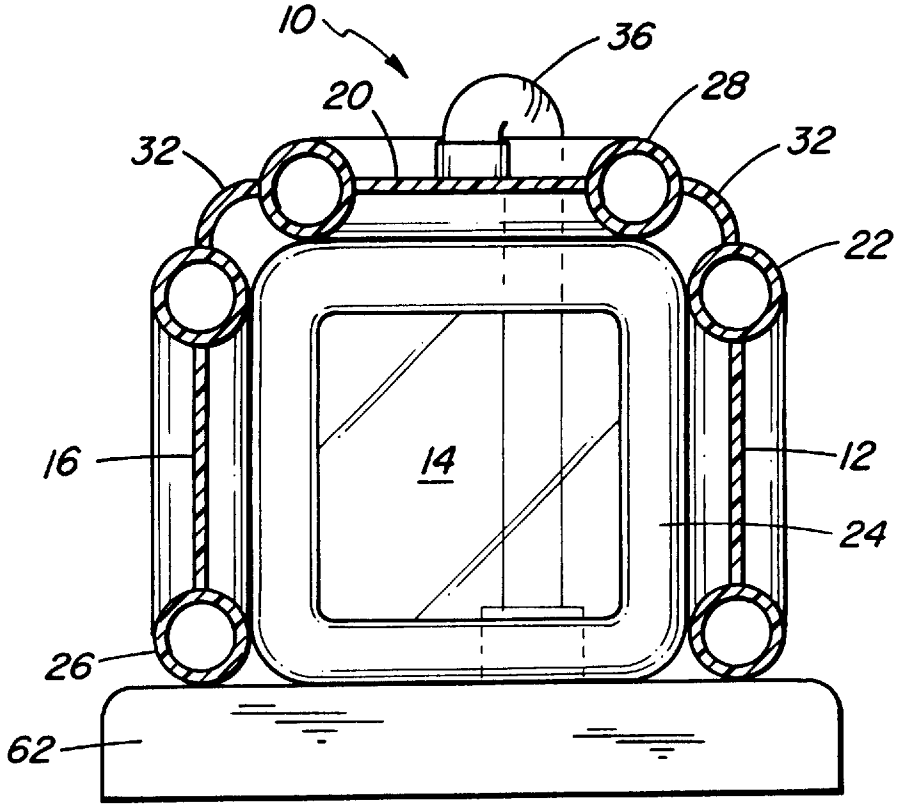
FIG. 5 illustrates in cross-section a front view of one embodiment of the present invention.

FIG. 5 shows section 5—5 indicated in FIG. 4. The chamber (10) is shown on a surface (62). Inflatable collars (22, 26 and 28) are shown in section. Inflatable collar (24) is also shown. The collars shown are substantially rounded but the invention contemplates collars which can obtain other shapes when inflated. Panels (12, 16 and 20) are shown in section as are the adjoining seems (32) between the collars.

Figure 6:
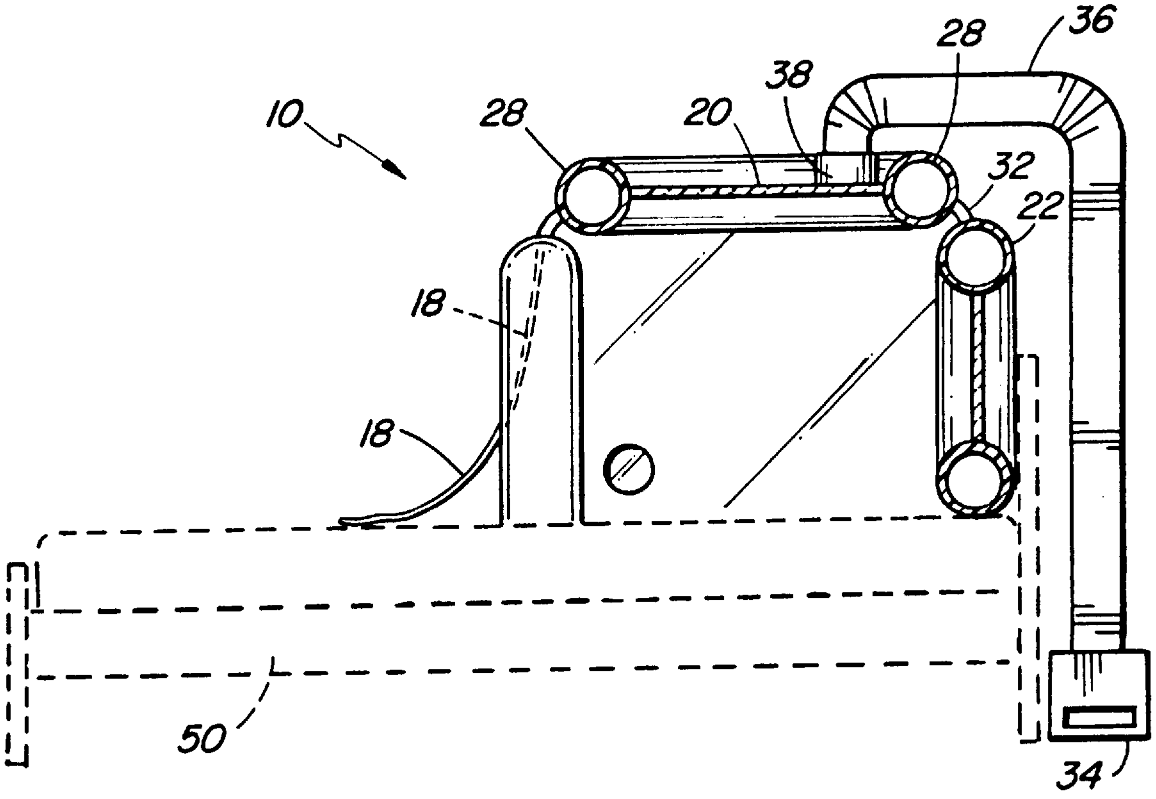
FIG. 6 illustrates in cross-section a side view of one embodiment of the present invention.

FIG. 6 shows section 6—6 indicated in FIG. 3. The chamber (10) is mounted on a sleeping surface (50). Top panel (20) is shown framed by inflatable collar (28). Seam (32) is also shown joining top inflatable collar (28) to side inflatable collar (22). Curtain (18) is shown closing the front end of the chamber and extending towards the foot of the sleeping surface to provide a suitable seal to maintain a positive air pressure within the chamber. Fan and filter assembly (34) is shown attached to hose (36) which is in communication with top panel (20) through connecting means (38).

The portable enclosure system as described herein was tested to determine its efficiency in removing particulates from the atmosphere of the chamber. A particulate counter capable of detecting particles from 2 microns in size to 5 microns in size per cubic foot of air was used to measure the concentration of allergens in the ambient air and in the air of the chamber over time.

Allergens of concern are shown in the following table:

TABLE 1

| ALLERGEN | SIZE microns | ALLERGEN | SIZE microns | ALLERGEN | SIZE microns |
|---|---|---|---|---|---|
| bacteria | 0.5–50 | cement powder | 5–150 | pollen | 10–50 |
| mold | 2–20 | human and animal hair | 5–500 | dust | 30–500 |
| skin flakes | 2–150 | wool fibre | >10 | cotton fibre | >50 |
| insect excrement | 5 | plant spores | 10–50 | mites | 100–300 |

During the test, the test system was placed on top of a bed in a normal household environment. The bed was agitated to simulate a person entering it as a large amount of particulate matter is found on the surface of the bed and is made air-borne when the bed is disturbed. The particulate concentration of the air within the chamber was measured over time and the results were as follows:

TABLE 2

| ELAPSED TIME | CONCENTRATION OF 2 MICRON PARTICLES PER CUBIC FOOT | CONCENTRATION OP 5 MICRON PARTICLES PER CUBIC FOOT |
|---|---|---|
| immediately after agitation | 75,900 | 8,300 |
| 5 minutes | 48,600 | 4,800 |
| 15 minutes | 4,500 | 700 |

In operation, the present invention had the following results:

TABLE 3

| ELAPSED TIME | CONCENTRATION OF 2 MICRON PARTICLES PER CUBIC FOOT | CONCENTRATION OP 5 MICRON PARTICLES PER CUBIC FOOT |
|---|---|---|
| immediately after bedding agitation | 11,100 | 900 |
| 5 minutes | 2,800 | 100 |
| 8 minutes | | 0 |
| 15 minutes | 900 | 0 |
| 30 minutes | 600 | 0 |
| 60 minutes | 300 | 0 |

The particulate concentration in the air being exhausted from the chamber was also measured with the following results:

TABLE 4

| ELAPSED TIME | CONCENTRATION OF 2 MICRON PARTICLES PER CUBIC FOOT | CONCENTRATION OP 5 MICRON PARTICLES PER CUBIC FOOT |
|---|---|---|
| immediately after bedding agitation | 38,700 | 7,300 |
| 5 minutes | 11,600 | 2,200 |
| 15 minutes | 400 | 0 |

Numerous modifications, variations, and adaptations may be made to the particular embodiments of the invention described above without departing from the scope of the invention, which is defined in the claims.

The embodiments of the invention in which an exclusive property or privilege is claimed are defined as follows:

1. A portable enclosure system for a person with a respiratory ailment, the system comprising:

a soft-walled structure defining an enclosure;

a means for supporting the structure;

a fan means to provide air;

a first means for receiving air supplied to the enclosure from the fan means;

a filter means for removing particulates from air provided by the fan means before the air is supplied to the first means for receiving air;

a means for exhausting air from the enclosure that ensures a positive pressure is maintained within the enclosure, the means for exhausting air also being adapted for receiving air into the enclosure in the event the fan means fails and the pressure within the enclosure approaches ambient levels; and the first means for receiving air within the enclosure being located within an upper region of the enclosure, laterally disposed and above from the means for exhausting the air, whereby when air is provided to the first means for receiving air from the fan means and the filter means, a gradient of filtered air is established from an upper region to a lower region within the enclosure, ensuring the removal of particulates from within the enclosure through the exhaust means.

2. The portable enclosure system of claim 1, wherein the enclosure can be of a plurality of shapes such as conical, rectangular, spherical or triangular, or a combination thereof.

3. The portable enclosure system of claim 1, further comprising a curtain-like partition covering an opening for receiving an upper torso and head of a patient into the enclosure.

4. The portable enclosure system of claim 3, wherein the curtain-like partition is flexible enough to permit movement of an adult or child whose upper torso and head are enclosed by the enclosure, yet dimensioned and resilient enough to ensure adequate closure of the opening and preventing unwanted particulates from entering the enclosure.

5. The portable enclosure system of claim 1 wherein, the enclosure is fabricated from a resilient plastic material.

6. The portable enclosure system of claim 5 wherein, the plastic material has the characteristics of transparency, light weight, pliability, durability, flexibility and resilience.

7. The portable enclosure system of claim 1 wherein, the enclosure is adequately dimensioned to enclose at least the upper torso and head of an adult or child.

8. The portable enclosure system of claim 1, wherein the means for supporting the structure comprises a plurality of rigid framing members releasably coupled together.

9. The portable enclosure system of claim 8 wherein the means for supporting the structure surround, and are fixed to, a panel.

10. The portable enclosure system of claim 9 wherein the rigid framing members are inflatable collars, each with a rectangular skirt extending outwardly from the inflatable collar.

11. The portable enclosure system of claim 10, wherein when the panels are joined in spaced relationship with each other to form the enclosure using the rectangular skirts of adjacent collars to form an air-tight seal between each of the adjacent collars.

12. The portable enclosure system of claim 11, wherein the chamber is counterweighted to provide for increased stability and to counter external loads thereon caused by attachment of the first air means for receiving air.

13. The portable enclosure system of claim 1, wherein the fan means is ac or dc powered and of a variable speed controllable by an operator to achieve the desired air flow.

14. The portable enclosure system of claim 1, wherein the means for receiving air is an air hose is of sufficient length and width to provide the desired air flow to the structure and is resilient, crush proof and light enough not to destabilize the enclosure.

15. The portable enclosure system of claim 1, wherein the filter means is a modular, removable, high efficiency particulate filter.

16. The portable enclosure system of claim 1, wherein the concentration of particulates within the structure, on a per volume basis, is reduced by at least 80% of its initial value within 15 minutes of operation.

17. A portable enclosure system for a person with a respiratory ailment, the enclosure system comprising, a soft walled structure defining a box-like hollow chamber for placement on a sleeping surface, closed on all four sides, the top and the bottom; said chamber assembled from rectangular transparent plastic panels on the back, top, and two sides, and a curtain on the front and covering an opening and comprised of an elastically deformable, resilient, rectangular sheet free at its bottom end and capable of sealing the opening to the chamber to prevent unwanted particulate matter from entering the chamber while not degrading the comfort of the person;

a means for supporting the structure comprising inflatable collars circumferentially surrounding each of head, top, and two side panels and fixed thereto, each of inflatable collars being surrounded by rectangular skirts extending outwardly so that skirts of adjacent collars overlap and connect together to form an air-tight seal between adjacent collars, and the curtain joined to the adjacent inflatable framing collars at the top and sides;

a first means for receiving air supplied to the enclosure, comprising a sufficiently long and crush proof air hose;

a fan means to provide the air supplied to the first means for receiving air, said fan means being ac or dc powered and capable of being adjusted to control the volume of air supplied to the enclosure;

a filter means to remove particulates from the air obtained from the fan means before the air is supplied to the first means for receiving air, a means for exhausting air from the enclosure that ensures a positive pressure is maintained within the enclosure and for receiving air into the enclosure should the fan means fail and the pressure within the enclosure approach ambient levels;

the first means for receiving air within the enclosure being located within an upper region of the enclosure, laterally disposed and above the means for exhausting air, whereby upon providing air to the first means for receiving air, from the fan means and the filter means, a gradient of filtered air is established from an upper region to a lower region within the enclosure, ensuring the removal of particulates from within the enclosure through the exhaust means.

* * * * *